United States Patent
Höhnke

(10) Patent No.: US 9,418,225 B2
(45) Date of Patent: Aug. 16, 2016

(54) TRANSMITTING DEVICE AND METHOD OF OVERLAYING SIGNALS WITH THE DEVICE

(71) Applicant: Fujitsu Technology Solutions Intellectual Property GmbH, München (DE)

(72) Inventor: Thorsten Höhnke, Königsbrunn (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/529,640

(22) Filed: Oct. 31, 2014

(65) Prior Publication Data

US 2015/0134984 A1 May 14, 2015

(30) Foreign Application Priority Data

Nov. 14, 2013 (DE) .................. 10 2013 112 548

(51) Int. Cl.
*H04L 29/06* (2006.01)
*G06F 21/55* (2013.01)
*H04B 3/54* (2006.01)

(52) U.S. Cl.
CPC .............. *G06F 21/558* (2013.01); *H04B 3/546* (2013.01); *G06F 2221/2123* (2013.01); *H04B 2203/5416* (2013.01); *H04B 2203/5495* (2013.01)

(58) Field of Classification Search
CPC .................................................. G06F 21/558
See application file for complete search history.

(56) References Cited

U.S. PATENT DOCUMENTS

| 5,126,748 | A * | 6/1992 | Ames | G01S 5/0009 342/353 |
| 6,507,585 | B1 * | 1/2003 | Dobson | H04L 25/03159 370/401 |
| 2002/0172119 | A1 * | 11/2002 | Kuroda | G11B 7/0053 369/53.34 |
| 2004/0246108 | A1 * | 12/2004 | Robertson | E21B 47/0007 340/854.3 |
| 2007/0237256 | A1 * | 10/2007 | Boos | H03C 5/00 375/295 |
| 2007/0293142 | A1 * | 12/2007 | Dehmas | G06K 7/0008 455/1 |
| 2011/0085647 | A1 * | 4/2011 | Hicks, III | H04L 12/10 379/90.01 |
| 2011/0299569 | A1 * | 12/2011 | Baba | G01R 31/31707 375/130 |

FOREIGN PATENT DOCUMENTS

| DE | 10 2007 034 932 A1 | 2/2008 |
| DE | 20 2008 008 792 U1 | 10/2008 |
| DE | 20 2013 102 200 U1 | 8/2013 |
| EP | 0 929 171 A2 | 7/1999 |

OTHER PUBLICATIONS

Messerges, Thomas S., Ezzy A. Dabbish, and Robert H. Sloan. "Power analysis attacks of modular exponentiation in smartcards. "Cryptographic Hardware and Embedded Systems. Springer Berlin Heidelberg, 1999.*

* cited by examiner

*Primary Examiner* — Shawnchoy Rahman
(74) *Attorney, Agent, or Firm* — DLA Piper LLP (US)

(57) ABSTRACT

A transmitting device that transmits data signals into a primary electricity grid, wherein the transmitting device connects to a power input of a computer system and overlays signals returned by the computer system into the primary electricity grid by modulating random data signals onto a line connected to the power input of the computer system.

7 Claims, 1 Drawing Sheet

TRANSMITTING DEVICE AND METHOD OF OVERLAYING SIGNALS WITH THE DEVICE

TECHNICAL FIELD

This disclosure relates to a transmitting device that transmits data signals into a primary electricity grid, the use of a transmitting device to transmit signals into a primary electricity grid, and to a method.

BACKGROUND

Security-relevant data such as passwords, for example, are a particular target of attacks on computer systems. What are known as side channel attacks are attacks on the security of a computer system not based on a direct interception of data signals. For example, load fluctuations on a primary power line correlate with the execution of individual processor commands. By what are known as "backscatter side channel" attacks, data signals can be obtained from these load fluctuations, and from the data signals thus obtained conclusions can in turn be drawn about the type of operation that a processor is running From these detected processor commands it is in turn possible to obtain information about processed data.

There is thus a need to provide a device, a use and a method of increasing the security of a computer system.

SUMMARY

I provide a transmitting device that transmits data signals into a primary electricity grid, wherein the transmitting device connects to a power input of a computer system and overlays signals returned by the computer system into the primary electricity grid by modulating random data signals onto a line connected to the power input of the computer system.

I also provide a method of overlaying signals of a computer system returned into a primary electricity grid, including generating random data signals, and modulating the generated data signals by a transmitting device onto a line connected to a power input of the computer system.

BRIEF DESCRIPTION OF THE DRAWINGS

Our devices and methods are explained in detail hereafter on the basis of examples and the figures.

LIST OF REFERENCE SIGNS

Figure 1:
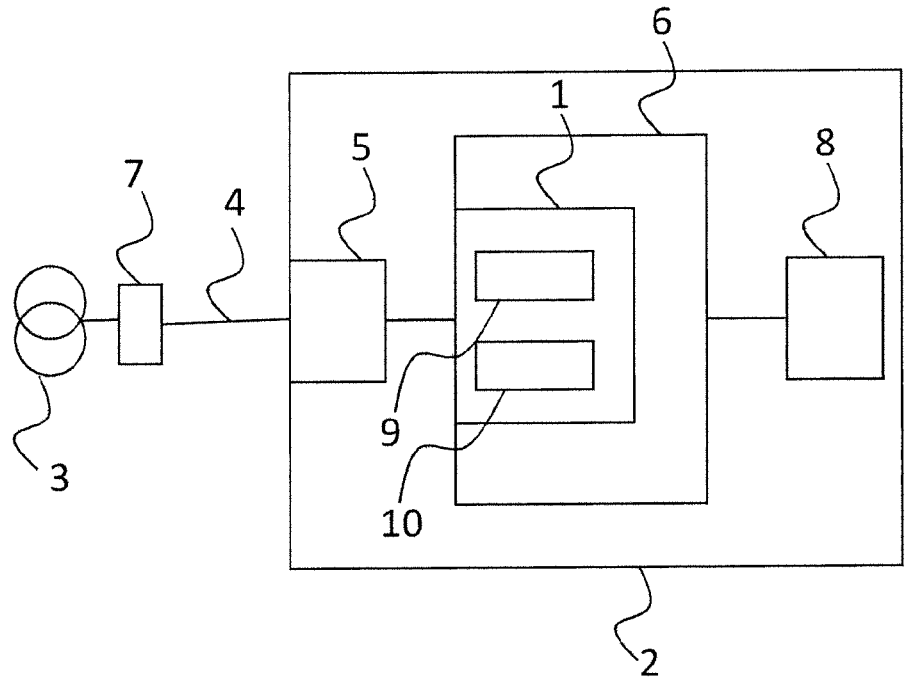
FIG. 1 shows a schematic representation of an arrangement according to one example.

1 Transmitting device
2 Computer system
3 Primary electricity grid
4 Line
5 Power input
6 Power supply unit
7 Plug socket
8 Processor
9 Microcontroller
10 Transmitting unit
11 Plug socket adapter
12 Power LAN adapter

DETAILED DESCRIPTION

We provide a transmitting device that transmits data into a primary electricity grid. The transmitting device can connect to a power input of a computer system. By modulating random data signals onto a line of the primary electricity grid connected to the power input of the computer system, the transmitting device is adapted to overlay signals returned by the computer system into the primary electricity grid.

When a processor is executing working commands, it has a certain power consumption that depends on the particular processor command just being processed. This power consumption can be measured in a primary electricity grid. By measuring a power output of the primary electricity grid, conclusions can therefore be drawn about processor commands. This in turn allows conclusions to be drawn about data being processed by the processor. Our transmitting devices modulate random data signals onto a line of the primary electricity grid overlaid on the returned data signals of the processor of the computer system. It is thus no longer possible to obtain information about processor commands of the computer system from a measurement at the primary electricity grid.

Advantageously, the transmitting device is arranged in a power supply unit of the computer system.

Advantageously, the transmitting device is arranged in a plug socket adapter.

Further advantageously, the transmitting device comprises a power LAN adapter.

Because the transmitting device is arranged such that the data signals are modulated upstream of a plug socket, protection is provided against attacks from outside an area.

We also provide for the use of a transmitting device. The transmitting device is used to transmit signals into a primary electricity grid, for the purpose of overlaying signals of a computer system returned into the primary electricity grid. Data signals are modulated onto a line of the primary electricity grid connected to a power input of the computer system. Here, the data signals are random.

We further provide a method of overlaying signals of a computer system returned into a primary electricity grid. The method comprises the steps:

generating random data signals, and
modulating the generated data signals by a transmitting device onto a line of the primary electricity grid connected to a power input of the computer system.

FIG. 1 shows a transmitting device 1. The transmitting device 1 is arranged in a power supply unit 6 of a computer system 2 and connects via a power input 5, line 4 and a plug socket 7 to a primary electricity grid 3. The computer system 2 is a server. It may also be a desktop PC or some other data-processing device. The primary electricity grid 3 delivers a supply voltage for the computer system 2.

The computer system 2 comprises a processor 8. The processor 8 can process various commands. In this connection, different commands cause a different power consumption in the processor 8. Because the power consumption of the processor 8, and hence of the computer system 2, is dependent on the commands being processed, different loads occur at the power input 5 of the computer system 2. These can be measured at the primary electricity grid 3 as returned signals of the computer system 2.

The transmitting device 1 comprises a microcontroller 9, which generates random data and supplies this to a transmitting unit 10 of the transmitting device 1. The transmitting unit 10 modulates this random data onto the line 4. The modulated random data covers a bandwidth of the line 4, for example, 2 to 68 MHz. In particular, the modulated random data covers a band-width that corresponds to a bandwidth of the signals of the computer system 2 returned into the primary electricity grid 3. Thus, even after a filtering of a fixed frequency of the primary electricity grid 3, for example, 50 Hz, no information relating to processor signals can be obtained.

Figure 2:
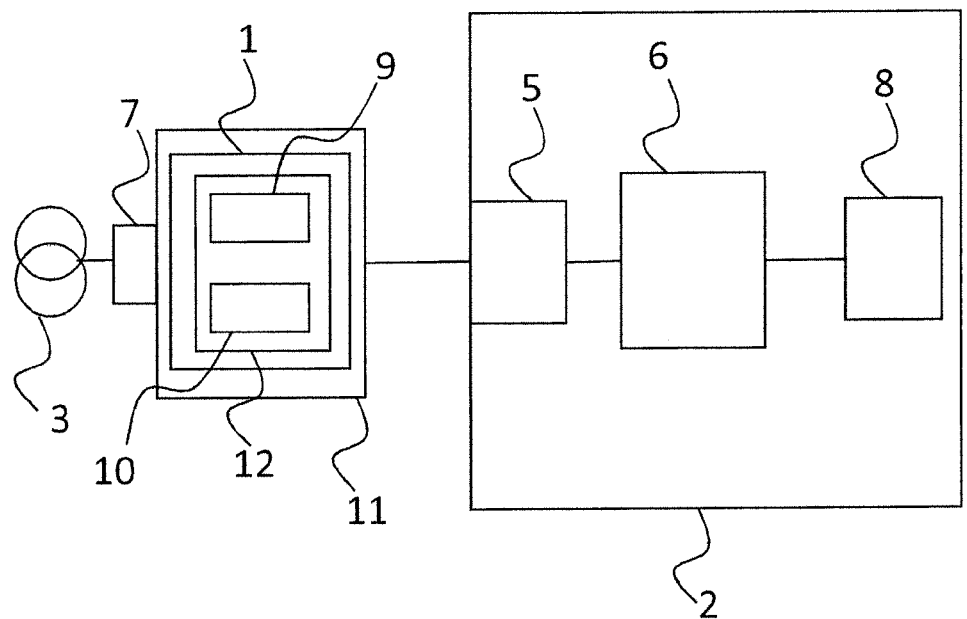
FIG. 2 shows a schematic representation of an arrangement according to a further example.

FIG. 2 shows an example in which the transmitting device 1 is arranged in a plug socket adapter 11 and comprises what is known as a power LAN adapter 12. The signal generated by the transmitting device 1 is modulated onto a connection (not shown in FIG. 2) of the plug socket adapter 11. The microcontroller 9 runs stored control software. Instead of information-bearing data signals, as customary in conventional power LAN adapters, the stored control software generates random data signals. The data signals thus generated are overlaid on returned data signals of the computer system and thus prevent the returned data signals from being spied on.

The invention claimed is:

1. A transmitting device that transmits data signals into a primary electricity grid, wherein the transmitting device connects to a power input of a computer system and overlays signals returned by the computer system into the primary electricity grid by modulating random data signals onto a line connected to the power input of the computer system.

2. The transmitting device according to claim 1, wherein the transmitting device is arranged in a power supply unit of a computer system.

3. The transmitting device according to claim 1, wherein the transmitting device is arranged in a plug socket adapter between the primary electricity grid and the power input of the computer system.

4. The transmitting device according to claim 1, wherein the transmitting device comprises a power LAN adapter.

5. A method of overlaying signals of a computer system returned into a primary electricity grid, comprising:
   generating random data signals; and
   modulating the generated data signals by a transmitting device onto a line connected to a power input of the computer system.

6. The transmitting device according to claim 2, wherein the transmitting device comprises a power LAN adapter.

7. The transmitting device according to claim 3, wherein the transmitting device comprises a power LAN adapter.

* * * * *